(No Model.)
F. E. DECKER.
ROTARY ENGINE.
No. 371,675. Patented Oct. 18, 1887.
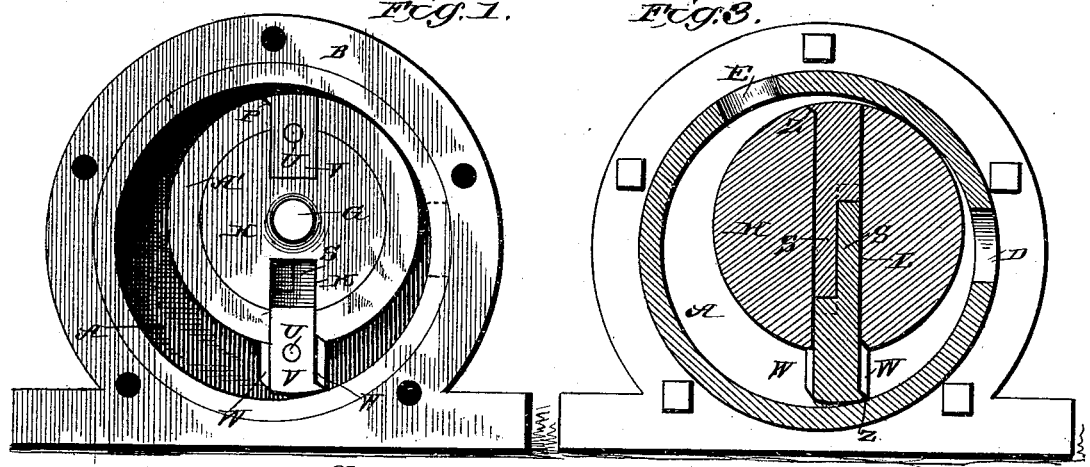
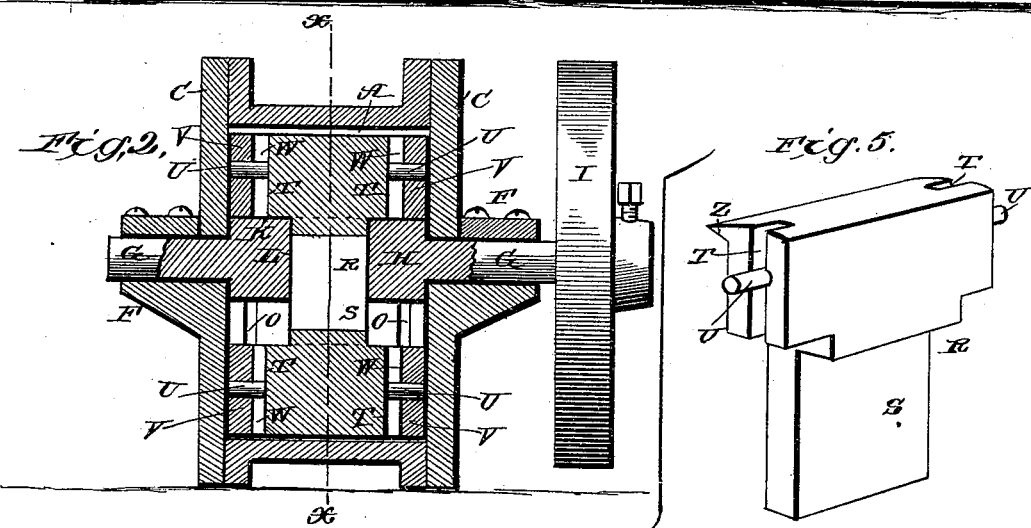
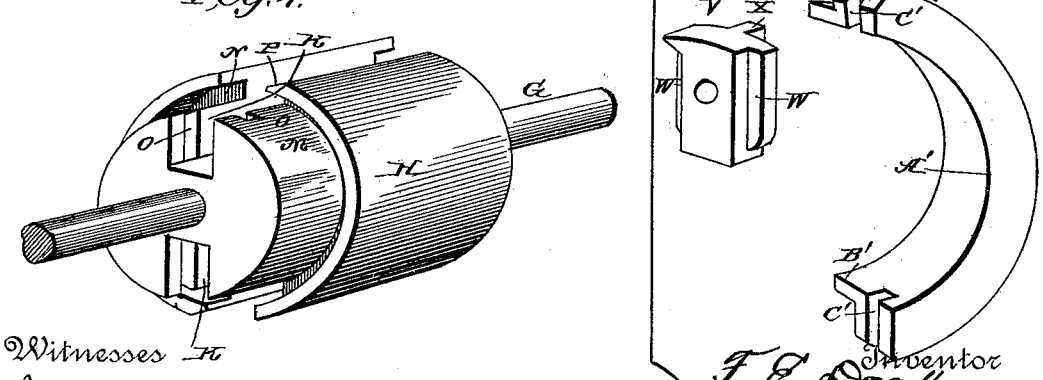

UNITED STATES PATENT OFFICE.

FRED E. DECKER, OF ARNOT, NEW YORK.

ROTARY ENGINE.

SPECIFICATION forming part of Letters Patent No. 371,675, dated October 18, 1887.

Application filed May 31, 1887. Serial No. 239,844. (No model.)

*To all whom it may concern:*

Be it known that I, FRED E. DECKER, a citizen of the United States, residing at Arnot, in the county of Chemung and State of New York, have invented a new and useful Improvement in Rotary Engines, of which the following is a specification.

My invention relates to an improvement in rotary steam-engines; and it consists in the peculiar construction and combination of devices that will be more fully set forth hereinafter, and particularly pointed out in the claims.

In the drawings, Figure 1 is an elevation of a rotary stem-engine embodying my improvements, with parts of one of the sides of the case removed, so as to disclose the interior construction of the engine. Fig. 2 is a vertical longitudinal sectional view of the same. Fig. 3 is a vertical transverse sectional view taken on the line $x\,x$ of Fig. 2. Fig. 4 is a detail view of the piston, and Fig. 5 represents detail views of various parts.

A represents a hollow cylindrical case, which is provided at its ends with annular projecting flanges B.

C represents a pair of end plates, which are bolted to the said flanges, and thus close the ends of the case. In one side of the latter is an inlet-port, D, and near the upper side of the case is an exhaust-port, E. On the outer side of the end plates, C, are formed bearing-boxes F, which are eccentrically arranged on the said plates, and in the said bearing-boxes are journaled the spindles or trunnions G, which project from opposite ends of a cylindrical piston, H, which is arranged eccentrically in and extends entirely through the case A and bears against one side thereof at a point midway between the openings D and E. To one of the projecting spindles of the cylindrical piston is secured a fly-wheel, I.

In opposite sides of the cylindrical piston are made longitudinal radial open grooves or recesses K, and through the center of the said piston extends a longitudinal slot, L, which communicates with the inner sides of the grooves K and aligns therewith. The ends of the cylindrical piston are reduced in diameter for a suitable distance to form annular shoulders M, and annular grooves N are made in the ends of the recessed or cut-away portions of the rotary piston. In the opposing sides of the radial grooves K, near the ends thereof, are made grooves O, which are arranged transversely with relation to the grooves K, as shown. Opposite sides of the grooves K are beveled at their outer edges, as at P.

R represents a pair of wings which fit snugly in the grooves K and are provided on their inner sides with projecting arms S, that extend through the central slot in the rotary piston and bear upon each other and form a lap-joint. The length of the said wings is such that their ends extend to the inner sides of the radial grooves O in the ends of the grooves K. Radial grooves T are made in the ends of the wings and from the centers of the said grooves project outwardly-extending dowel-pins U.

V represents packing plates or blocks, which are provided at opposite edges with flanges W, adapted to fit in the radial grooves O, and are provided on their inner sides with flanges or tongues X, which fit in the grooves T in the ends of the wings. The said packing-blocks are provided with transverse openings, which receive the dowel-pins. The width of the grooves O is somewhat in excess of the thickness of the tongues or flanges W, and thereby the packing-blocks are adapted to be moved longitudinally on the ends of the wings, for the purpose to be hereinafter described. The outer edges of the wings are each provided on one side with a laterally-extending beveled flange, Z, which is adapted to fit in the corresponding beveled portion, P, of the groove K, in which the wing is located.

A' represents packing segments which are made of metal and are provided on their inner edges with segmental flanges B', that enter the recesses or grooves N. The sides and ends of the packing-segments are on the same planes with the ends and periphery of the cylindrical piston, respectively, and thereby the said packing-segments fill the annular recesses made in the ends of the cylindrical piston. The opposing ends of the packing-segments are provided with radial grooves C', which receive the flanges W and coincide with and form continuations of the grooves O.

The operation of my invention is as follows: One side of the cylindrical piston bears against one side of the cylindrical case, as before described, and the wings are normally projected radially from opposite sides of the cylindrical piston, so that the outer edges of the said wings fit snugly against the inner side of the cylindrical casing. When steam is admitted to the cylindrical case under pressure through the port D, it strikes against one of the radial wings and forces the same around in the case until the said wing uncovers the exhaust-port and the steam escapes therefrom. Owing to the fact that one side of the cylindrical piston bears constantly against one side of the cylindrical case midway between the inlet and discharge ports thereof, the back-pressure of the steam against the wings is prevented, and consequently the piston is kept in constant rotation in one direction. The pressure of the steam against the lateral lips or flanges at the outer edges of the wings keeps the said wings expanded tightly against the bore of the cylindrical case, and the pressure of the steam against the packing-blocks and packing-segments causes the same to be pressed laterally against the end plates of the case. While one of the wings is passing beyond the outlet-port the other has just passed beyond the inlet-port, and, as a consequence, the pressure of the steam against the wings is uninterrupted and the cylindrical piston is positively impelled at every point of its rotation.

Having thus described my invention, I claim—

1. The combination, in a rotary engine, of the eccentrically-journaled cylindrical piston having the radial grooves K on opposite sides thereof, the radial wings arranged in the said grooves and adapted to move radially therein, and the packing-blocks on the ends of the said wings, said packing-blocks being provided with side flanges working in grooves made in the sides of the grooves K near the ends thereof, substantially as described.

2. The combination, in a rotary engine, of the piston, the radially-movable wings projecting therefrom, the packing-blocks V on the ends of the said wings and having the tongues W, and the packing-segments A', fitted on the ends of the piston and having the grooves C' at their ends to receive the tongues W, whereby the packing-segments are interlocked with the packing-blocks, substantially as described.

3. The combination, in a rotary engine, of the piston, the radially-movable wings having the grooves T in their ends and the projecting dowel-pins U, and the packing-blocks V, having the tongues X to enter the grooves T and the openings to receive the dowel-pins, substantially as described.

4. In a rotary engine, the combination of the piston having the annular grooves N in its ends and the radial grooves K, the radially-movable wings R, having the grooves T in their ends and the projecting pins U, the packing-blocks V, having the tongues X to enter the grooves T, the openings to receive the pins and the tongues W, and annular packing-segments fitted on the ends of the piston and provided at their ends with the grooves C' to receive the tongues W of blocks V, substantially as described.

In testimony that I claim the foregoing as my own I have hereto affixed my signature in presence of two witnesses.

FRED E. DECKER.

Witnesses:
 MARY E. DECKER,
 EMMA R. DECKER.